Sept. 20, 1960 J. A. BROWN 2,953,048
ANGLE-INDICATING ATTACHMENT FOR A PIPE BENDER
Filed July 1, 1959 2 Sheets-Sheet 1

INVENTOR.
JAMES A. BROWN

Sept. 20, 1960 J. A. BROWN 2,953,048
ANGLE-INDICATING ATTACHMENT FOR A PIPE BENDER
Filed July 1, 1959 2 Sheets-Sheet 2

INVENTOR.
JAMES A. BROWN

United States Patent Office 2,953,048
Patented Sept. 20, 1960

2,953,048

ANGLE-INDICATING ATTACHMENT FOR A PIPE BENDER

James A. Brown, 11716 Gurley Ave., Downey, Calif.

Filed July 1, 1959, Ser. No. 824,273

4 Claims. (Cl. 81—15)

The present invention consists of an angle-indicating attachment for a pipe bender, which throughout this application shall also be construed to mean a tube or tubing bender, wherein the angle-indicating attachment visibly observably indicates the angular deflection of a pipe or tube during a bending operation of such a pipe or tube by any of several different conventional types of pipe or tubing benders, thus greatly facilitating the use of such pipe or tubing benders. This is particularly desirable in connection with the bending of thin-walled electrical conduit, which frequently needs to be bent or provided with an offset portion involving several bends, in order to follow the appropriate contours of a building or structure which is to carry the conduit. In the past, it has been necessary to use a substantially empirical approach in using conventional pipe or tubing benders for this purpose. However, it is possible through the use of the angle-indicating device of the present invention and certain trigonometric tables devised by me to predetermine and plan the exact number of pipe or tubing bends, the lengths between said bends, and the angular relationships of each of said bends necessary in order to provide virtually any desired type of single or multiple offset portions along the length of a pipe or tube whereby to match the proper pipe-laying line in virtually any type of structure. It was with this desirable objective in view that I invented the subject angle-indicating attachment for a conventional pipe or tubing bender.

It is an object of the present invention to provide an angle-indicating attachment for a pipe bender as defined hereinbelow. The attachment includes a controllably engageable and disengageable clamp member adapted to be clamped to the vertical lever portion of a conventional pipe bender adjacent to the bottom thereof and in fixed angular relationship with respect thereto. The clamp member is provided with a substantially horizontally directed pivot pin means projecting therefrom, and is further provided with an arcuate angle-indicating scale means having mounting means pivotally mounting the same for movement around the center of curvature thereof, which is coincident with said pivot pin means. The clamp member is further provided with an angle-indicating pointer projecting radially therefrom with respect to said pivot pin means and having a pointer end positioned in closely adjacent angle-indicating relationship with respect to the arcuate angle-indicating scale means. The attachment also includes follower means adapted to rest upon the upper surface of the pipe which is to be bent at a location longitudinally spaced along the length of the pipe from the region thereof which is to be bent, and which is engaged by a conventional pipe bender having its lever portion engaged by said clamp member. The follower means is provided with and pivotally connected to first ends of two longitudinal rigid connecting links of the same length, which have second ends pivotally connected with respect to the mounting means of said arcuate angle-indicating scale means, with a spacing between said second ends identical to the spacing between said first ends. This effectively defines a parallelogrammatic linkage means effectively connecting said arcuate angle-indicating scale means and said follower means, whereby to maintain a predetermined angular relationship between said angle indicating scale means and said follower means irrespective of the amount of forced deflection of the lever portion of the pipe bender during the bending of a pipe, which will cause corresponding deflection of the clamp member and the angle-indicating pointer means with respect to the arcuate angle-indicating scale means, whereby the angular deflection of the pipe being bent will be visibly observably indicated.

It is a further object to provide apparatus of the character set forth in the preceding object, wherein said angle-indicating scale means is controllably rotatably angularly shiftable and fastenable with respect to said mounting means, whereby to provide a proper zero angle reading of the pointer means with respect to the scale means at the beginning of a pipe bending operation irrespective of the required position of the pipe bender.

It is a further object to provide an angle-indicating attachment of the character set forth in either of the preceding objects, in combination with a pipe bender.

It is a further object to provide apparatus of the character set forth in any of the preceding objects, which is of simple, cheap, foolproof construction, such as to be conducive to widespread use of the apparatus.

Further objects will be apparent to persons skilled in the art after a careful study hereof.

For the purpose of clarifying the nature of the present invention, one exemplary embodiment is illustrated in the hereinbelow-described figures of the accompanying two sheets of drawings, and is described in detail hereinafter.

Figure 1:
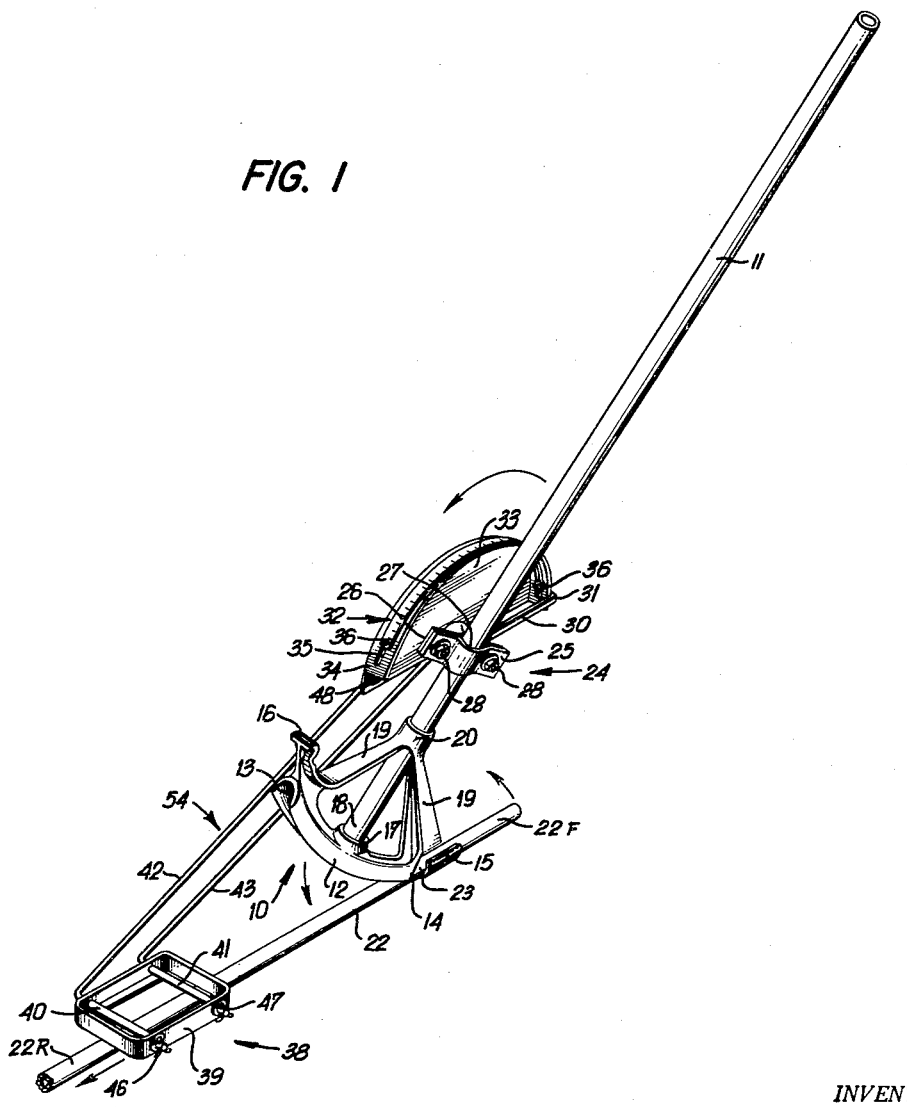
Fig. 1 is a perspective view of one exemplary embodiment of the invention shown in operative relationship with respect to a piece of pipe to be bent.

In the specific embodiment of the invention illustrated, one type of conventional prior art pipe bender is employed and consists of an effectively arcuate pipe bending head, indicated generally at 10, and a longitudinal lever portion 11. The effectively arcuate pipe bending head means 10 includes an arcuate grooved portion 12 having an entry opening 13 at the rear end thereof and an exit opening 14 at the front end thereof and spaced forwardly therefrom a hook member 15. Furthermore, the pipe bending head means 10 includes a foot pedal 16 at the rear thereof, a threaded fitting member 17 adapted to threadedly engage the lower end 18 of the lever portion 11, and two structural members 19 which extend upwardly to a collar portion 20 which is mounted around the lever portion 11. It will be understood that, in use, the forward end 22 of a pipe which is to be bent is passed laterally through the open slot 23, which exists between the forward exit opening 14 of the arcuate grooved channel 12 and the arcuately forwardly spaced hook member 15, in a manner such that the hook member 15 engages the underneath side of said pipe 22 while the upper side of said pipe 22 is engaged by the arcuate grooved portion 12 in the initial position shown in Fig. 1. It will be understood that an operator's foot is adapted to be pressed downwardly on the foot pedal 16, while the operator's hands may be used to apply force to the upper end of the lever portion 11. This will effectively bend the pipe 22 from the initial position shown in Fig. 1 into the angularly deflected position shown in Fig. 2, wherein the forward portion 22F of the pipe has been effectively angularly deflected upwardly from the direction of the remainder of the rear portion 22R of the pipe.

The angle-indicating attachment of the present invention includes the clamp member, indicated generally at 24, which consists of two opposed elements 25 and 26 defining therebetween a circular opening 27 adapted to receive therethrough and frictionally engage the lever portion 11. The angle-indicating attachment further includes threaded fastener means 28 controllably fastening the opposed elements 25 and 26 tightly around the lever portion 11. In the specific example illustrated, the clamp member 24 is provided with a substantially horizontally rearwardly directed pivot pin means 29 projecting therefrom, and is additionally provided with an angle-indicating pointer 30 projecting radially from the rear portion of the clamp member 24, and from the pivot pin means 29. The angle-indicating pointer 30 has a transversely rearwardly directed pointer end 31, the purpose of which will be explained in greater detail hereinafter.

Also, in the specific example illustrated, an arcuate angle-indicating scale means, indicated generally at 32, is provided with mounting means comprising a semi-circular plate 33 having a transverse arcuately curved flanged edge 34 which is arcuately slotted, as indicated at 35, and which exteriorly carries the arcuate angle-indicating scale means 32 in any selected position with relation to the arcuate flanged portion 34. This is accomplished by means of threaded fastener means 36, which may be fastened in any selected location along the arcuate slot 35 for zero angle adjustment purposes. The mounting plate 33 is pivotally mounted, as indicated at 37, with respect to said horizontal pivot pin means 29.

Figures 2, 3:
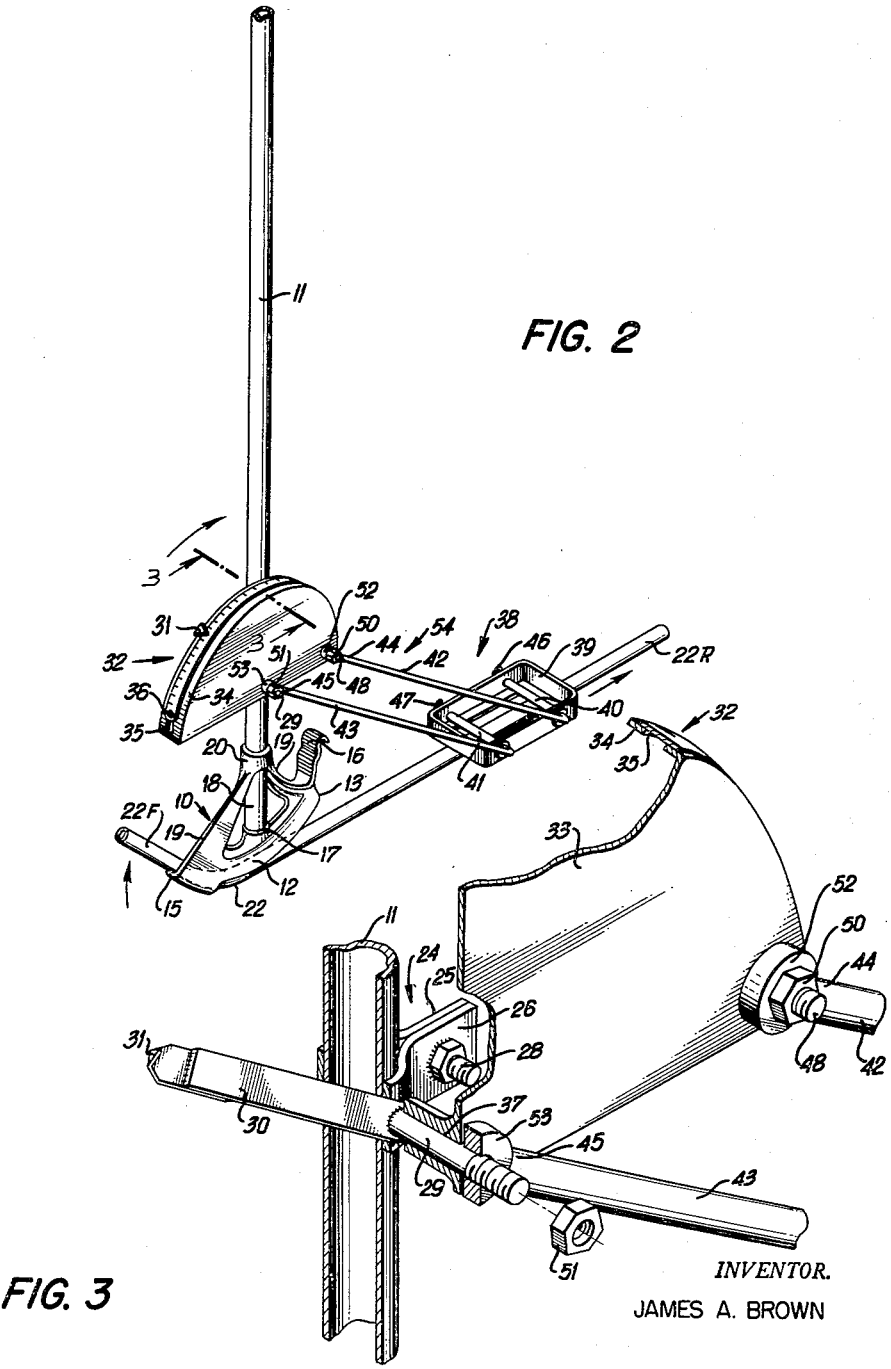
Fig. 2 is a perspective view as seen from the other side of the device shown in Fig. 1, and shows the device after the pipe has been bent through a certain angular deflection.
Fig. 3 is a sectional view taken in the direction of the arrows 3—3 of Fig. 2.

Also, the specific example illustrated includes follower means, indicated generally at 38, adapted to rest upon the upper surface of the rear portion 22R of the pipe. In the specific example illustrated, the follower means consists of a rectangular member 39 made of angle iron and having pivotally connected thereto transversely directed first ends 40 and 41 of corresponding longitudinal rigid connecting links 42 and 43, respectively, which have second ends 44 and 45, respectively, pivotally connected to the mounting plate 33. It should be noted that retaining pins 46 and 47 act to fasten the transverse first ends 40 and 41 in pivotal relationship with respect to the apertured opposite sides of the rectangular member 39, and that threaded fastening studs 48 and 29, corresponding threaded fastening nuts 50 and 51 and corresponding apertured portions 52 and 53 rotatable with respect to the threaded fastening studs 48 and 29, provide for effective pivotal mounting of said second ends 44 and 45 with respect to the mounting plate 33. It should also be noted that each of the rigid connecting links 42 and 43 is of the same length and that the spacing between the first ends 40 and 41 thereof and the second ends 44 and 45 thereof are equal. This effectively defines what may be termed a parallelogrammic linkage means, as indicated generally at 54, effectively connecting the follower means 38 with respect to the mounting means 33, whereby to maintain a predetermined angular relationship therebetween irrespective of forced deflection of the lever portion 11 of the pipe bender during the bending of the forward end 22F of the pipe, which will cause corresponding angular deflection of the clamp member 24 and the angle-indicating pointer means 30 and the pointer end 31 thereof with respect to the arcuate angle-indicating scale means 32, whereby the angular deflection of the forward end 22F of the pipe being bent will be visibly observably indicated. As previously mentioned, the fastening means 36 may be loosened, if desired, in order to allow the angle-indicating scale means 32 to be arcuately adjusted along the arcuate slot 35 so that the pointer end 31 will initially point at a zero angle setting on the scale means 32 at the beginning of a tube bending operation as shown in Fig. 1.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An angle-indicating attachment for a pipe bender, comprising: a pipe bender including pipe bending head means and a longitudinal lever portion; a controllably engageable and disengageable clamp member adapted to be clamped to the lever portion of the pipe bender adjacent the bottom thereof and in fixed angular relationship with respect thereto, said clamp member having pivot pin means projecting therefrom; an arcuate angle-indicating scale means provided with mounting means pivotally mounting same for movement around the center of curvature thereof with respect to said pivot pin means; said clamp member being provided with an angle-indicating pointer projecting radially therefrom with respect to said pivot pin means and having a pointer end positioned in closely adjacent angle-indicating relationship with respect to said arcuate angle-indicating scale means; follower means adapted to rest upon the upper surface of a pipe which is to be bent at a location longitudinally spaced along the length of the pipe from the region thereof which is to be bent and which is engaged by the pipe bender having its lever portion engaged by said clamp member; and two longitudinal rigid connecting links of the same length; said follower means being spacedly pivotally connected to first ends of said two longitudinal rigid connecting links of the same length, which have second ends spacedly pivotally connected with respect to said arcuate angle-indicating scale means, with a spacing between said second ends identical to the spacing between said first ends to effectively define a parallelogrammic linkage means connecting said arcuate angle-indicating scale means and said follower means, whereby to maintain a predetermined angular relationship between said angle-indicating scale means and said follower means irrespective of the magnitude of forced deflection of the lever portion of the pipe bender during the bending of a pipe, which will cause corresponding deflection of the clamp member and the angle-indicating pointer means with respect to the arcuate angle-indicating scale means, whereby the angular deflection of a portion of a pipe being bent will be visibly observably indicated.

2. Apparatus of the character defined in claim 1, wherein said arcuate angle-indicating scale means is controllably rotatably angularly shiftable and fastenable with respect to said mounting means, whereby to provide a proper zero angle reading of the pointer means with respect to the scale means at the beginning of a pipe-bending operation irrespective of the required position of the pipe bender.

3. Apparatus of the character defined in claim 1, wherein said clamp member consists of two opposed elements defining therebetween an opening adapted to receive therethrough and frictionally engage the lever portion of the pipe bender, and including threaded fastener means controllably fastening said opposed elements tightly together around said lever portion.

4. An angle-indicating attachment for a conventional pipe bender adapted to visibly observably indicate the angular deflection of a pipe during a pipe-bending operation, comprising: a pipe bender including pipe bending head means and a longitudinal lever portion; a controllably engageable and disengageable clamp member adapted to be clamped to the lever portion of the pipe bender adjacent the bottom thereof and in fixed angular relationship with respect thereto, said clamp member consisting of two opposed elements defining therebetween an opening adapted to receive therethrough and frictionally engage the lever portion, and including threaded fastener means controllably fastening said opposed elements tightly together around said lever portion, said clamp member having a substantially horizontally directed pivot pin means projecting therefrom; an arcuate angle-indicating scale means provided with mounting means pivotally mounting the same for movement around the center of curvature thereof with respect to said pivot pin means; said clamp member being provided with an angle-indicating pointer projecting radially therefrom with respect to said pivot pin means and having a pointer end positioned in closely adjacent angle-indicating relationship with respect to said arcuate angle-indicating scale means; follower means adapted to rest upon the upper surface of a pipe which is to be bent at a location longitudinally spaced along the length of the pipe from the region thereof which is to be bent and which is engaged by the pipe bender having its lever portion engaged by said clamp member; two longitudinal rigid connecting links of the same length; said follower means being transversely spacedly pivotally connected to first ends of said two longitudinal rigid connecting links of the same length, which have second ends similarly transversely spacedly pivotally connected to the mounting means carrying said arcuate angle-indicating scale means, with a spacing between said second ends identical to the spacing between said first ends to effectively define a parallelogrammic linkage means connecting said arcuate angle-indicating scale means and said follower means, whereby to maintain a predetermined angular relationship between said angle-indicating scale means and said follower means irrespective of the magnitude of forced deflection of the lever portion of the pipe bender during the bending of a pipe, which will cause corresponding deflection of the clamp member and the angle-indicating pointer means with respect to the arcuate angle-indicating scale means, whereby the angular deflection of a portion of a pipe being bent will be visibly observably indicated, said arcuate angle-indicating scale means being controllably rotatably angularly shiftable and fastenable with respect to said mounting means, whereby to provide a proper zero angle reading of the pointer means with respect to the scale means at the beginning of a pipe-bending operation irrespective of the required position of the pipe bender.

References Cited in the file of this patent
UNITED STATES PATENTS

| | | |
|---|---|---|
| 1,863,693 | Mingori | June 21, 1932 |
| 1,889,239 | Crowley | Nov. 29, 1932 |
| 2,382,266 | Simonsen | Aug. 14, 1945 |
| 2,730,157 | Ponting | Jan. 10, 1956 |
| 2,754,879 | Gautier | July 17, 1956 |
| 2,817,986 | Benfield | Dec. 31, 1957 |
| 2,887,917 | Kowal | May 26, 1959 |

FOREIGN PATENTS

| | | |
|---|---|---|
| 58,247 | Switzerland | Oct. 14, 1911 |
| 1,065,945 | France | Jan. 13, 1954 |